United States Patent
Lindstrom

(10) Patent No.: US 7,215,664 B2
(45) Date of Patent: May 8, 2007

(54) ARRANGEMENT AND METHOD FOR PROTECTION SWITCHING

(75) Inventor: Michael N. O. Lindstrom, Tullinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1007 days.

(21) Appl. No.: 10/279,027

(22) Filed: Oct. 24, 2002

(65) Prior Publication Data

US 2003/0090997 A1 May 15, 2003

Related U.S. Application Data

(60) Provisional application No. 60/331,040, filed on Nov. 7, 2001.

(30) Foreign Application Priority Data

Nov. 1, 2001 (EP) .................................. 01850181

(51) Int. Cl.
*H04J 1/16* (2006.01)
(52) U.S. Cl. .................. 370/370; 219/370; 219/395.31
(58) Field of Classification Search ................ 370/219, 370/220, 227, 221, 386, 392, 395.3, 395.31, 370/419, 428
See application file for complete search history.

(56) References Cited

U.S. PATENT DOCUMENTS

| | | | | |
|---|---|---|---|---|
| 6,721,269 B2 * | 4/2004 | Cao et al. | .................. | 370/227 |
| 6,940,810 B1 * | 9/2005 | Roa-Diaz | .................... | 370/217 |
| 6,952,395 B1 * | 10/2005 | Manoharan et al. | ........ | 370/219 |
| 7,039,045 B1 * | 5/2006 | Gullicksen | .................. | 370/380 |
| 7,075,889 B2 * | 7/2006 | Shiozawa | .................... | 370/228 |
| 2003/0012481 A1 * | 1/2003 | Fant et al. | .................... | 385/16 |

FOREIGN PATENT DOCUMENTS

| | | |
|---|---|---|
| DE | 197 41 431 | 3/1999 |
| WO | WO 99/11090 | 3/1999 |

* cited by examiner

*Primary Examiner*—Brenda Pham
(74) *Attorney, Agent, or Firm*—Nixon & Vanderhye P.C.

(57) ABSTRACT

The present invention relates to an arrangement and a method for protection switching. According to the invention the arrangement includes at least one primary and at least one secondary egress switch port, a routing table and a selection table. The method includes: Checking which group identity an ingress flow identity of a data flow is associated with. Checking if a primary or a secondary egress switch port routing address is to be used for said group identity. Switching the data flow to the egress switch port corresponding to the egress switch port routing address that is to be used.

7 Claims, 8 Drawing Sheets

ARRANGEMENT AND METHOD FOR PROTECTION SWITCHING

PRIORITY APPLICATION

This application claims priority from U.S. provisional patent application No. 60/331,040, filed on Nov. 7, 2001, the disclosure of which is incorporated herein by reference.

TECHNICAL FIELD

The present invention relates to an arrangement and a method for protection switching.

BACKGROUND OF THE INVENTION

Protection switching is a network survivability technique with dedicated protection resource allocation. Examples of this for ATM may be read in ITU-T Recommendation I.630 "Integrated services digital network (ISDN) maintenance principles. ATM protection switching", February 1999. Protection switching according to I.630 may be implemented also in other systems in a similar way.

In ITU-T Recommendation G.841 "Digital networks. Types and characteristics of SDH network protection architectures", July 1995, more examples of protection switching can be found.

A protected domain defines one or more units, for which a survivability mechanism is provided in the event of an impairment affecting that or those units. The concept "unit" should in this context be interpreted broadly and may for example be a switch port, an external switch or router link, groups of data flows or an individual data flow. The protected domain normally begins after a selector, bridge or similar of one endpoint—a source—and extends to a selector, bridge or similar of another endpoint—a sink. A protected domain may thus extend e.g., across a network connection, across a subnetwork connection or across a single link connection.

A working entity is the portion of a unit that is within the protected domain from which working traffic is received at the sink of the protected domain under fault-free condition.

A protection entity is the portion of a unit that is within the protected domain from which working traffic is received at the sink of the protected domain where a working entity has failed.

A protection switching architecture may be of e.g., a 1+1 type or an m:n type.

In the 1+1 architecture type, "hot" standby, a protection entity is dedicated to the working entity with the working traffic bridged onto the protection entity at the source of the protected domain. The traffic on working and protection entities is transmitted simultaneously to the sink of the protected domain, where a selection between the working and protection entity is made based on some predetermined criteria, such as a server defect indication. An example of 1+1 may be found in EP 1 056 309 A1.

In the m:n architecture type, "cold" standby, m dedicated protection entities are shared by n working entities, where m≦n typically. The bandwidth of each protection entity should be allocated in such a way that it may be possible to protect any of the n working entities in case at least one of the m protection entities is available. When a working entity is determined to be impaired, it first must be assigned to an available protection entity followed by transition from the working to protection entity at both the source and sink of the protected domain.

SUMMARY OF THE INVENTION

The problem is that there exists no practical implementations of an m:n architecture for protection switching and the object of the invention is to achieve this.

This is solved by using a switching fabric including at least one primary and at least one secondary egress switch port, a routing table and a selection table. The routing table is arranged to indicate which group identity an ingress flow identity of a data flow is associated with. The selection table is arranged to indicate if a primary egress switch port routing address or a secondary egress switch port routing address is to be used for said data flow.

The data flow can then be switched to the egress switch port corresponding to the egress switch port routing address that is to be used.

The advantage is that this is a simple and easy implementation. Further advantages may be seen in the different embodiments.

The invention will now be described in more detail with the aid of preferred embodiments and with reference to enclosed drawings.

PREFERRED EMBODIMENTS

Figure 1:
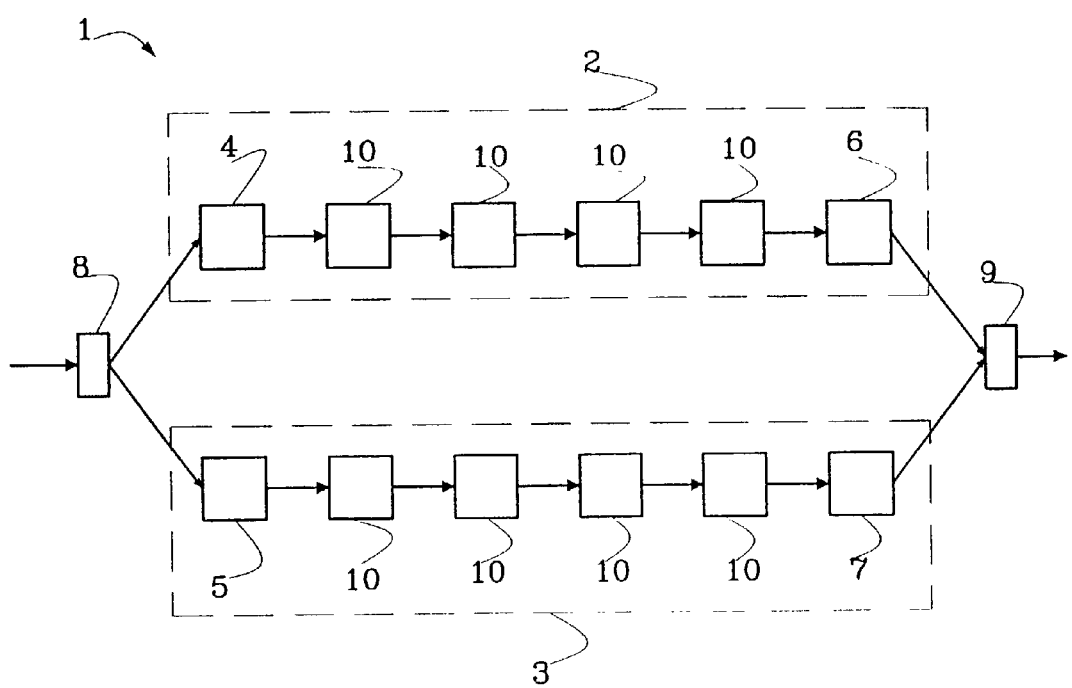
FIG. 1 shows a block diagram over a protected domain.

FIG. 1 shows a simple example of a protected domain 1 including a working entity 2 and a protection entity 3. In the opposite ends of the working and protection entities 2, 3, there are sources 4, 5 and sinks 6, 7. Between the source 4, 5 and the sink 6, 7 there may optionally be a number of connection points 10. The network may of course be much more complicated than the simple example in FIG. 1. FIG. 1 further shows a first and a second protection switching function 8, 9.

In the case of a 1+1 architecture type, so-called "hot standby", a data flow, i.e., a traffic data stream, is transmitted simultaneously on both the working and the protection entity 2, 3. The second protection function 9 works as a selector and selects one of the data flows.

In the case of a 1:1 architecture type, so-called "cold standby", said data flow is in normal operation only sent on the working entity 2. If the working entity 2 becomes impaired then the data flow is instead only sent on the protection entity 3.

The 1:1 architecture may be extended to an m:n architecture, where m dedicated protection entities are shared by n working entities. As an example one protection entity may be shared by 3 working entities, thus being a 1:3 architecture.

Figure 2:
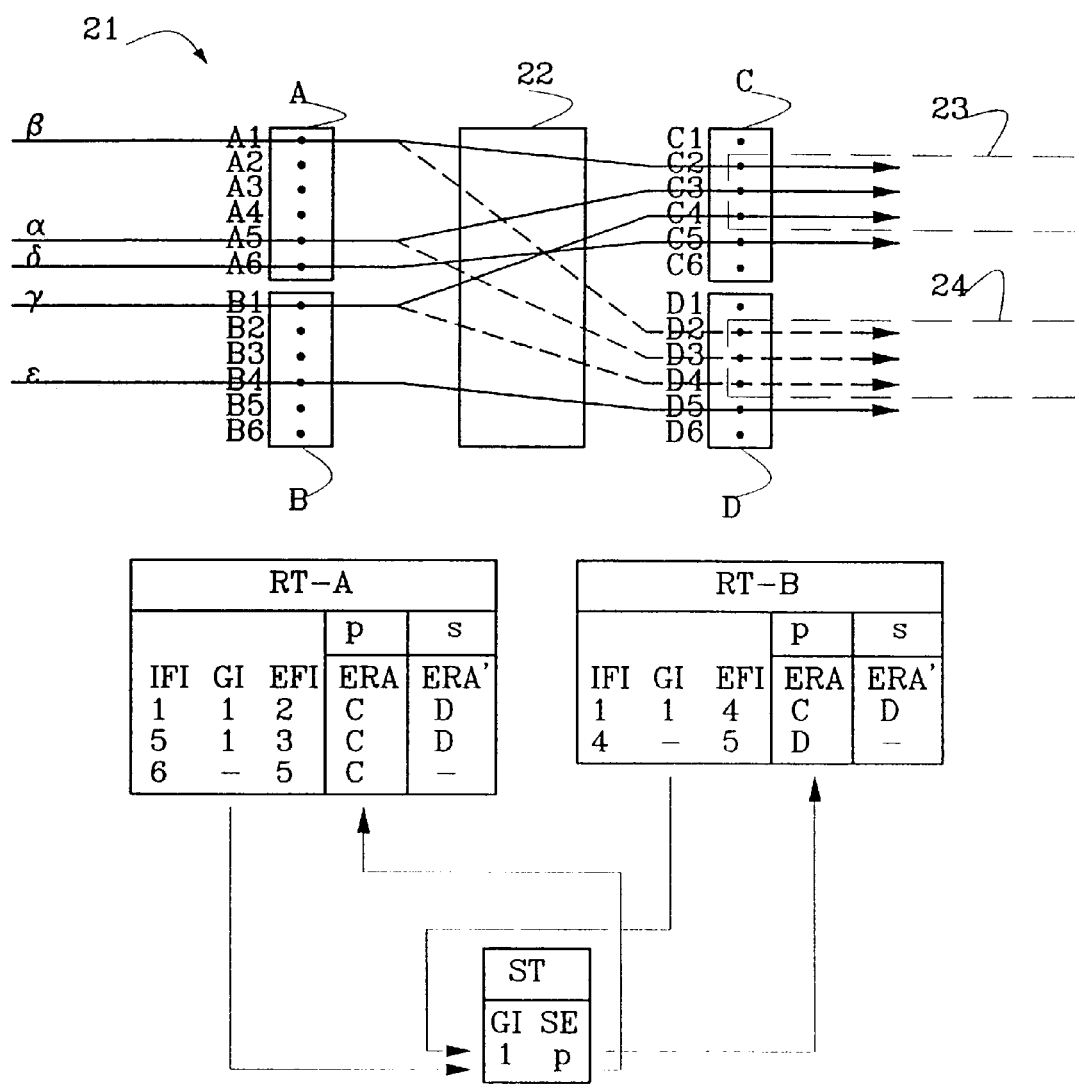
FIG. 2 shows a block diagram over a first embodiment of a switching fabric according to the invention.

In FIG. 2 is shown an example on how to implement a 1:1 architecture on the source side of FIG. 1. FIG. 2 shows a switching fabric 21 including a switch core 22, two ingress switch ports A, B and two egress switch ports C, D. Different data flows per switch port A, B, C, D are assigned different flow identifiers and in each switch port A, B, C, D flow resources A1, A2, A3, A4, A5, A6, B1, B2, B3, B4, B5, B6, C1, C2, C3, C4, C5, C6, D1, D2, D3, D4, D5, D6 are allocated.

An exemplary data flow α is shown entering the switching fabric 21 in the first ingress switch port A, passing the switch core 22 and leaving the switching fabric 21 in the first egress switch port C. When the data flow α comes into the first ingress switch port A, it has an ingress flow identifier IFI. The ingress flow identifier IFI uniquely identifies the data flow α in the ingress switch port A and thus distinguishes the data flow α from other data flows passing the same ingress switch port A. For the data flow α the ingress flow identity IFI equals 5, which means that the data flow α will be using flow resource A5 of the first ingress switch port A. A routing table RT-A for the first ingress switch port A is consulted for where to switch a data flow with said ingress flow identifier IFI.

In the routing table RT-A there are some information stored that is required in order to know how to switch the data flow α, and this is an egress switch port routing address ERA and an egress flow identifier EFI. The egress switch port routing address ERA is used by the switch core 22 to address the first egress switch port C. The egress flow identifier EFI is used in the first egress switch port C in a corresponding manner as the ingress flow identifier IFI is used in the first ingress port A, i.e., to distinguish the data flow α from other data flows passing the same egress switch port C. If packet or cell switching is used, said information may be added to the packet or cell as a tag or similar, so that the switch core 22 knows where to switch the data flow α.

A survivability mechanism, e.g., a 1:1 protection mechanism as described above, may be applied to one or more data flows using the same protected domain. In FIG. 2 one or more flow resources within the first egress switch ports C may be compared to the first source 4 in FIG. 1 and may thus be seen as belonging to a working entity 23 in a protection domain. In FIG. 2 one or more flow resources within the second egress switch ports D may be compared to the second source 5 in FIG. 1 and may thus be seen as belonging to a protection entity 24 in the protection domain. It is also possible that flow resources from more than one egress switch port can be grouped into one source 4, 5. The remaining part of the switching fabric 21 may be compared to the first protection switching function 8 in FIG. 1.

The survivability mechanism means that one or more data flows α normally using the first egress switch port C, in this case working as a primary egress switch port, and part of the protected domain is/are to be moved or switched over to the second egress switch port D, which in this case works as a stand-by egress switch port. At the same time there may be other data flows using the same first egress switch port C which are not part of the protected domain and thus not affected by the switch-over. Also, there may be other data flows using the second egress switch port D as a primary egress switch port.

An easy way of switching over is by simply changing the egress switching port routing address ERA from C to D for said data flows α as is seen indicated in FIG. 2 with a dashed line. The corresponding flow resource C3, D3 will then be used in both egress switch ports C, D.

In the same way a second exemplary data flow β belonging to the same protected domain as the first data flow α and normally using flow resources A1 and C2, will be switched over to flow resource D2. Further, a third exemplary data flow γ belonging to the same protected domain as the first data flow α and normally using flow resources B1 and C4, will be switched over to flow resource D4. That the data flows α, β and γ belongs to the same protected domain may be indicated with a group identifier GI, which in this case is 1.

In order to know which egress switch port C, D that is to be used for the moment a selection table ST can be used comprising one entry for the group identity GI and one selection entry SE for either "primary" or "secondary". The latter will indicate "primary" (in FIG. 2 marked as "p") in normal operation, but will be changed to "secondary" (in FIG. 2 marked as "s") in the case of a fault discovered in the working entity 23 belonging to the corresponding group identity GI.

What "primary" or "secondary" means in a particular case, may then be seen from the routing table RT. In the Figures the primary egress switch port address has been marked ERA and the secondary egress switch port address has been marked ERA'.

Note that above is only described an example on how different tables may look. As an example, the selection table may be common for all ingress switch ports, or there may be a separate selection table for each ingress switch port. As another example, the "p" and "s" columns seen in the routing tables in the Figures, may be in a separate table which is referred to from the routing table. The importance is the function, not the exact look of the tables.

Figure 5:
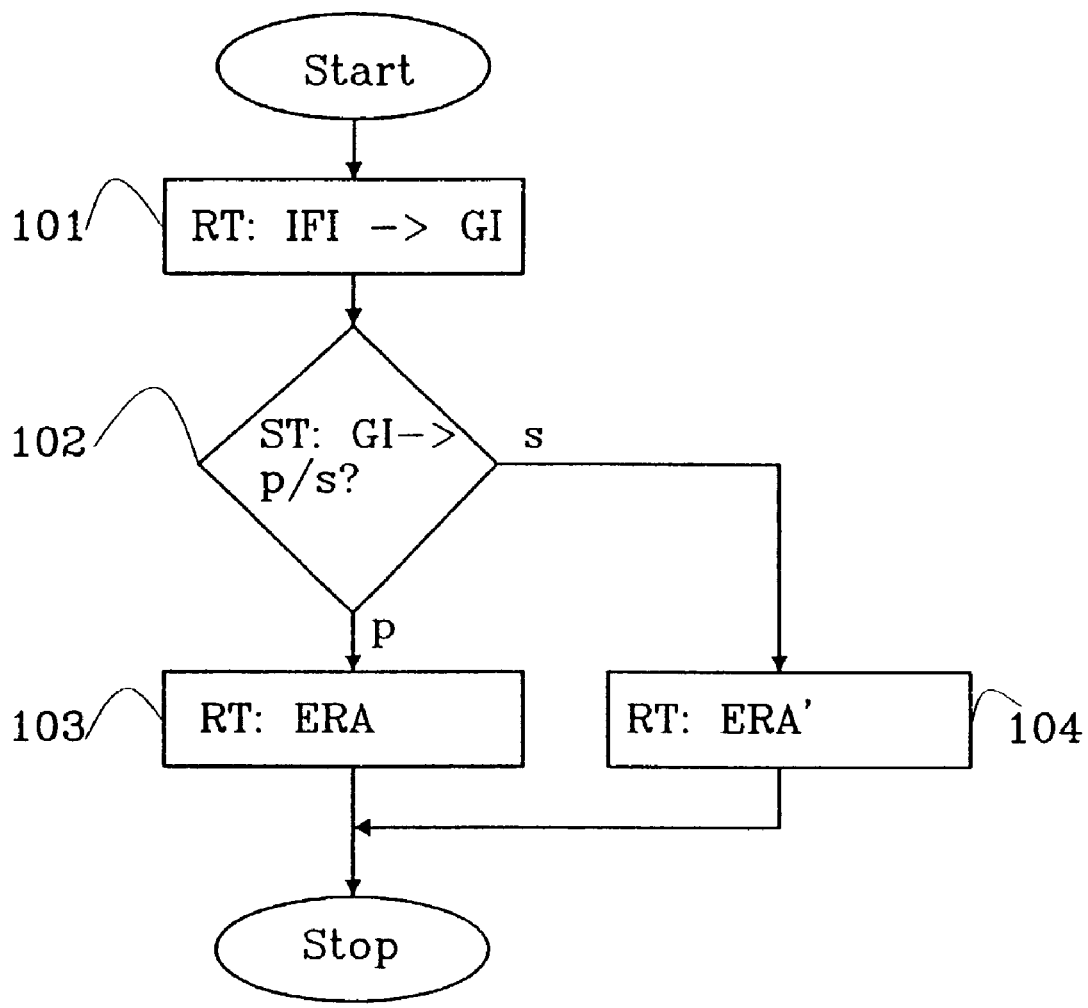
FIG. 5 shows a flow chart of a method according to a first embodiment of the invention.

An example of a more detailed process when a data flow comes into an ingress switch port can thus be, see FIG. 5: Check in the routing table RT if the ingress flow identity IFI is associated with a group identity GI and thus if the data flow is protected, block 101. Check in the selection table ST if the primary or the secondary egress switch port is to be used for that particular group identity GI, block 102. If the primary egress switch port is to be used then check in the routing table RT which egress switch port is the primary egress switch port and switch the data flow accordingly, block 103. If the secondary egress switch port is to be used then check in the touting table RT which egress switch port is the secondary egress switch port and switch the data flow accordingly, block 104.

If the data flow is not protected it can be entered as having a default group identity, e.g., 0, and then the primary and secondary egress switch ports are always the same in the routing table. Another alternative is to only have entries for the primary egress port as is shown in FIG. 2.

This is a simple and easy way of implementing a switch-over for a protected domain in the case of a fault.

However, in normal operation said flow resource D2, D3 and D4 in the second egress switch port D cannot be used for anything else, but must be kept standby in case the data flows α, β and γ have to be switched over because of a fault. This gives a problem of poor resource usage.

Further, if a new data flow δ is to be added to the same protected domain, using e.g., the flow resource C5 in the first egress switch port C, then it might happen that the corresponding flow resource D5 in the second egress switch port D is already occupied. This is the case in FIG. 2, where a data flow ε, which is not earlier involved in the discussed protected domain, enters the second ingress switch port B in flow resource B6 and leaves the second egress switch port D in flow resource D5. This may prohibit the establishment of new data flows within the protected domain, despite the fact that flow resources are available.

This gets even more complicated in the case of m:n protection switching, where n>m. In this case all the primary egress switch ports will have a resource dependency towards the single or few secondary egress switch ports, which in turn means that all primary egress ports have dependencies between each other. Thus, an egress flow identity EFI used at one primary egress switch port cannot be used within any other primary egress switch port. In this case the risk of poor resource usage is very high.

One solution for improving the resource usage is to, in the case of a fault, go through all affected incoming data flows, search for free flow resources in the egress switch ports and modify the affected egress flow identities EFI accordingly.

This is difficult to do, because the number of affected data flows may be huge and the switch over operation should be very fast in order not to disturb the data flows. Also this solution becomes even more complicated in the case of m:n protection.

Figure 3:
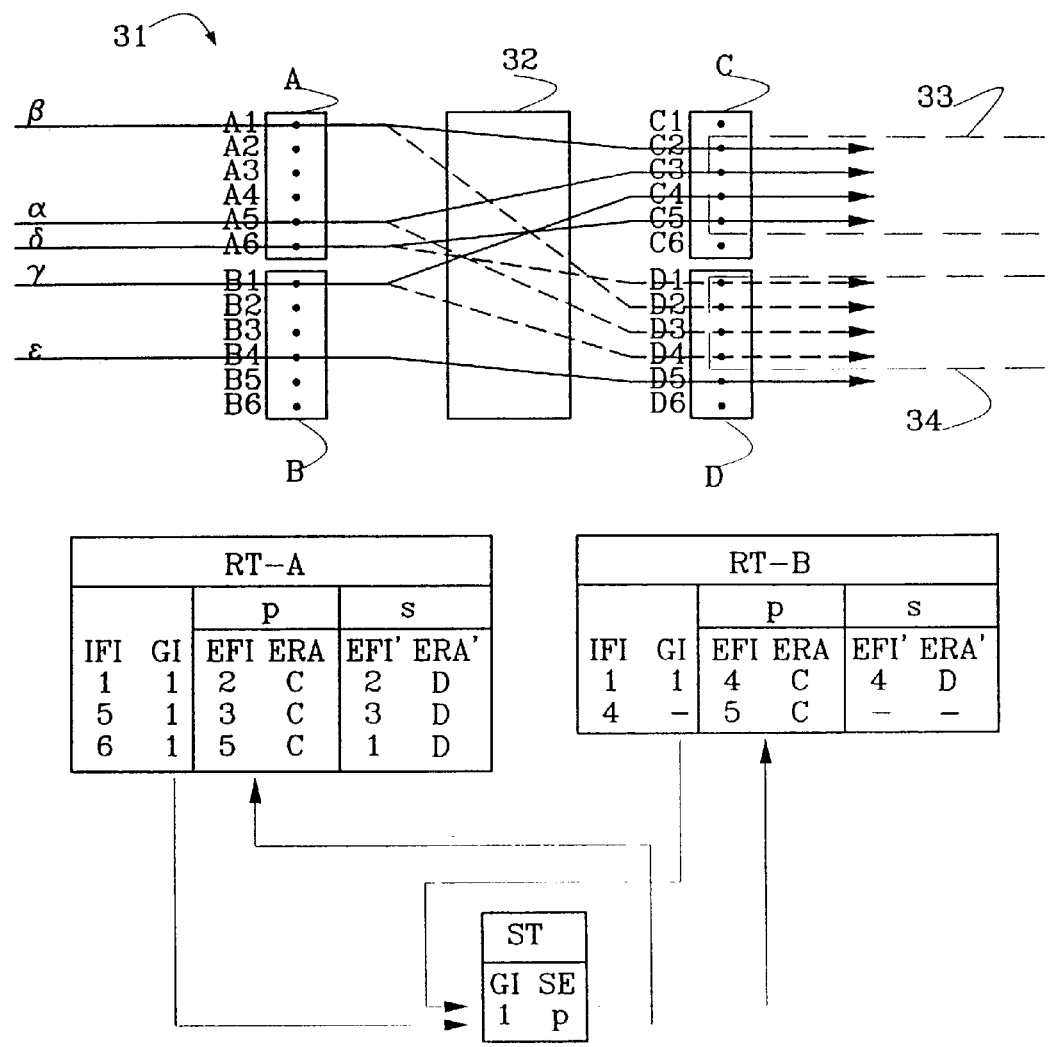
FIG. 3 shows a block diagram over a second embodiment of a switching fabric according to the invention.

An improved solution is shown in FIG. 3.

FIG. 3 is very similar to FIG. 2 and shows a switching fabric 31 including a switch core 32, two ingress switch ports A, B and two egress switch ports C, D. Further, the same exemplary data flows α, β, γ, δ, ε, and also a working entity 33 and a protection entity 34 are indicated.

However, in the routing tables RT-A, RT-B there is also place for a secondary egress flow identity EFI'. This makes it possible for the fourth data flow δ to also be a part of the working entity 33. This is done by giving the fourth data flow δ, not only a primary ERA and a secondary ERA' egress switch port routing address, but also a primary EFI and a secondary EFI' egress flow identifier. This provides a more flexible, but still simple, solution that will enable the use of the secondary egress switch port D in a more efficient way.

Figure 6:
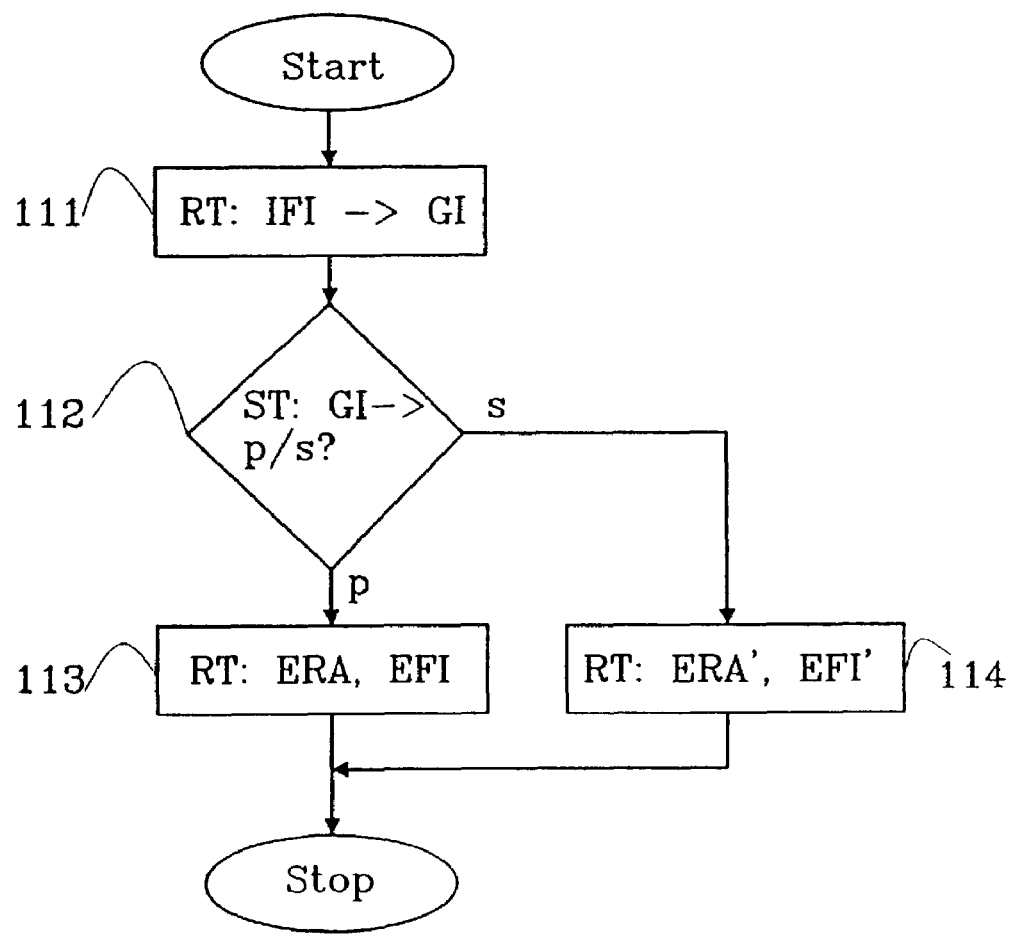
FIG. 6 shows a flow chart of a method according to a second embodiment of the invention.

An example of a more detailed process when a data flow comes into an ingress switch port can thus be, see FIG. 6: Check in the routing table RT if the ingress flow identity IFI is associated with a group identity GI and thus if the data flow is protected, block 111. Check in the selection table ST if the primary or the secondary egress switch port and egress flow identifier are to be used for that particular group identity GI, block 112. If the primary egress switch port and flow identifier are to be used then check in the routing table RT which egress switch port is the primary egress switch port and which egress flow identifier is the primary egress flow identifier and switch the data flow accordingly, block 113. If the secondary egress switch port is to be used then check in the routing table RT which egress switch port is the secondary egress switch port and which egress flow identifier is the secondary egress flow identifier and switch the data flow accordingly, block 104.

Figure 4A:
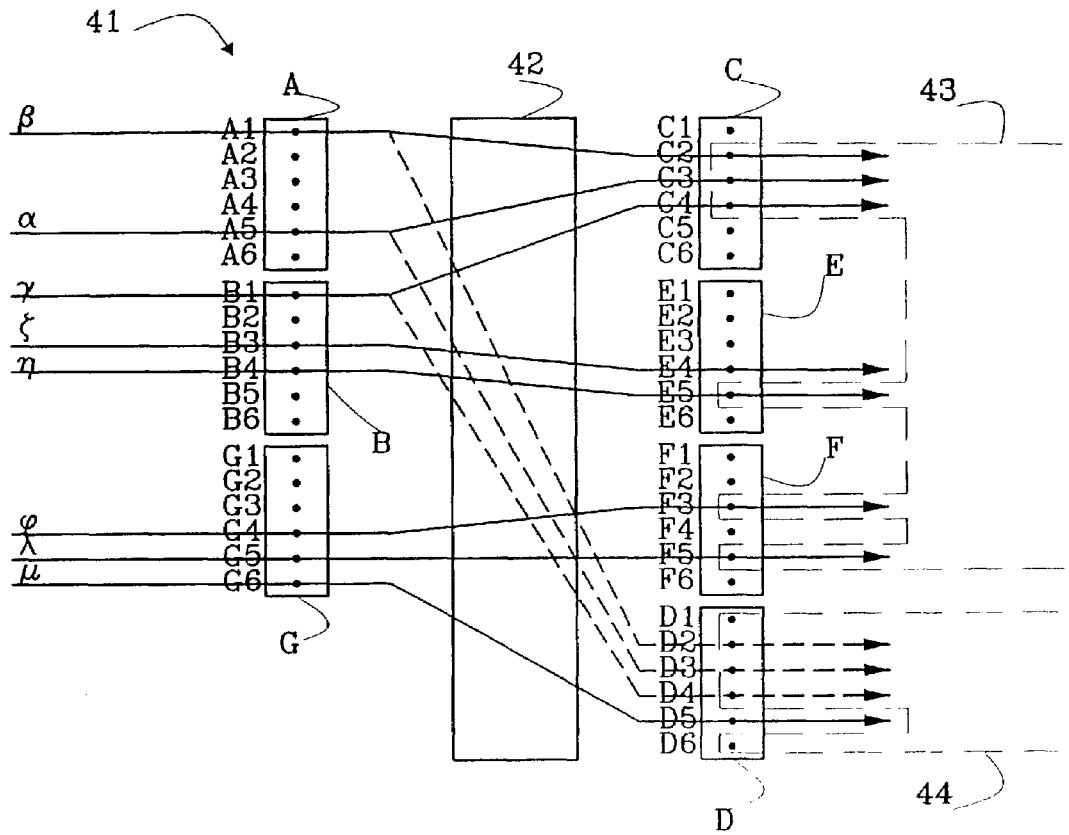
FIGS. 4a–c shows a block diagram over a third embodiment of a switching fabric according to the invention.
Figure 4B:
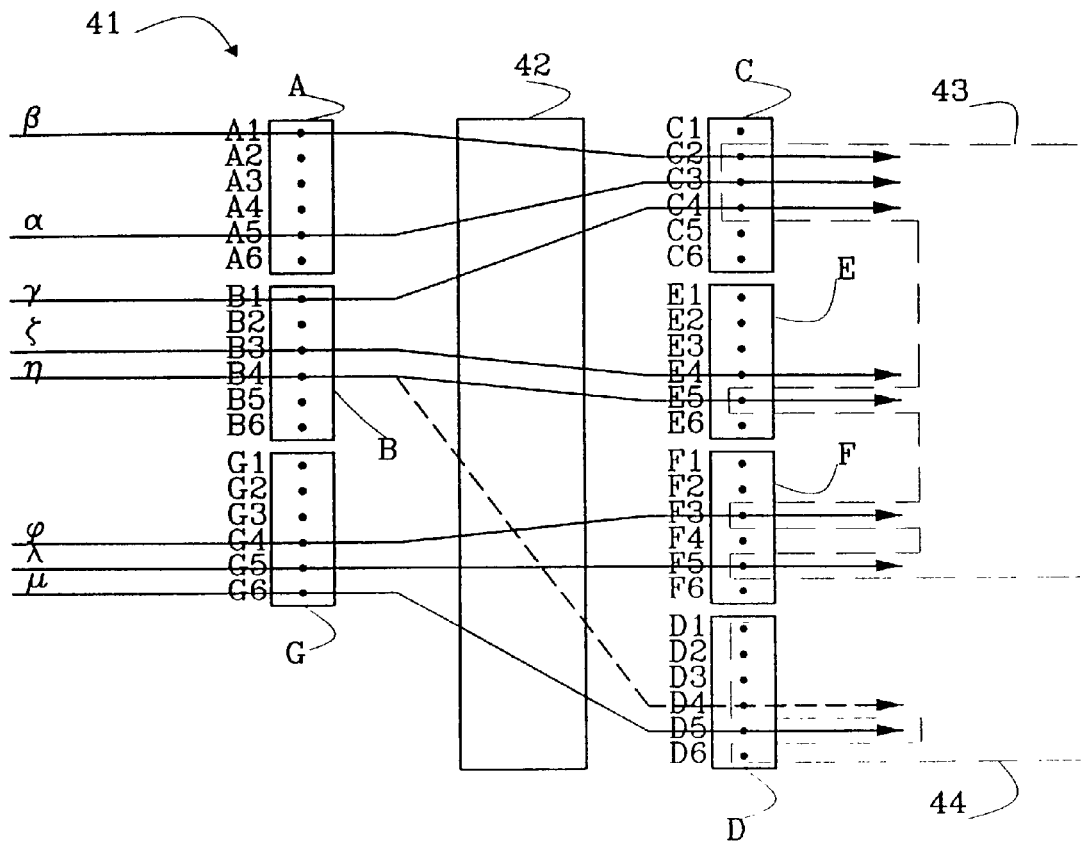
Figure 4C:
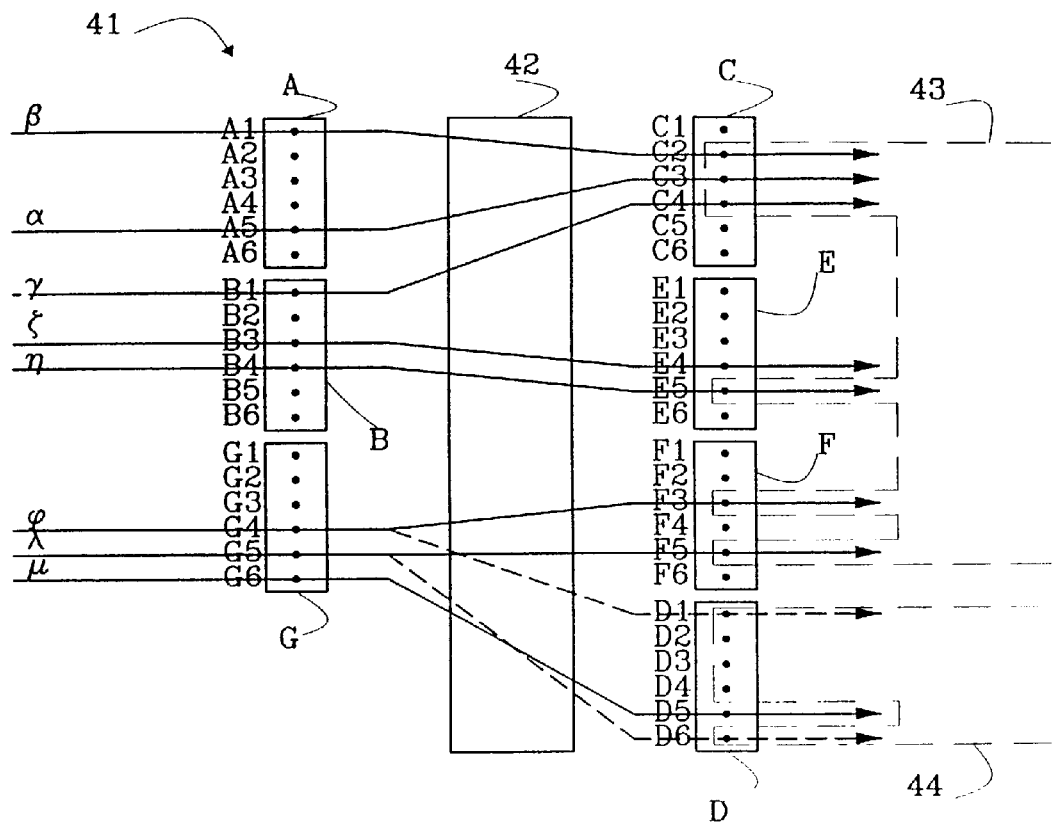

In FIGS. 4a–c is shown an example of a 1:3 architecture. A switching fabric 41 includes a switch core 42, three ingress switch ports A, B, G and four egress switch ports C, E, F, D. Each switch port A, B, C, D, E, F, G has six flow resources A1, A2, A3, A4, A5, A6, B1, B2, B3, B4, B5, B6, C1, C2, C3, C4, C5, C6, D1, D2, D3, D4, D5, D6, E1, E2, E3, E4, E5, E6, F1, F2, F3, F4, F5, F6, G1, G2, G3, G4, G5, G6. Further, six exemplary protected data flows α, β, γ, η, Φ, λ, two exemplary non-protected data flows ζ, μ, a working entity 43 and a protection entity 44 are indicated.

The first three egress switch ports C, E, F are used as primary egress switch ports, all belonging to the same working entity 43, but using different group identities GI=1, GI=2 and GI=3, respectively. The fourth egress port D is used as a secondary egress switch port and thus belongs to the protection entity 44.

The idea is that if there is a fault in the part of the working entity belonging to one of the switch egress ports, then the data flows in said part is instead switched over to the protected entity and the fourth egress port D. There are thus three alternatives of switch-over, depending on in which part of the working entity the fault occurs. FIG. 4a shows handling of a fault in the part of the working entity 43 where GI=1, i.e., related to the first egress switch port C. FIG. 4b shows handling of a fault in the part of the working entity 43 where GI=2, i.e., related to the first egress switch port E. Finally, FIG. 4c shows handling of a fault in the part of the working entity 43 where GI=3, i.e., related to the first egress switch port F.

The example in FIGS. 4a–c may of course be extended to any m:n architecture in a similar manner. Of course any number of ingress switch ports, any number of egress switch ports and any number of flow resources per switch port are possible in all the embodiments. The number of egress switch ports is not necessarily the same number as the number of ingress switch ports. Further, the number of flow resources is not necessarily the same for all switch ports.

The method according to the invention includes one for protection switching in a switching fabric including at least one primary egress switch port and at least one secondary egress switch port, said method including the following steps:
checking which group identity an ingress flow identity of a data flow is associated with,
checking if a primary egress switch port routing address or a secondary egress switch port routing address is to be used for said group identity,
switching the data flow to the egress switch port corresponding to the egress switch port routing address that is to be used.

If the primary egress switch port routing address (ERA) is to be used, then a primary egress flow identity (EFI) is assigned to the data flow. If the secondary egress switch port routing address is to be used, then a secondary egress flow identity is assigned to the data flow.

The method also is for protecting switching in a protected domain including a working entity and a protection entity. The working entity includes at least one flow resource of at least one primary egress switch of a switching fabric. The protection entity includes at least one flow resource of at least one secondary egress switch port of said switching fabric. The method includes the following steps:
checking which group identity an ingress flow identity of a data flow is associated with,
checking if a primary egress switch port routing address or a secondary egress switch port routing address is to be used for said group identity,
switching the data flow to the egress switch port corresponding to the egress switch port routing address that is to be used.

If the primary egress switch port routing address is to be used, then a primary egress flow identity is assigned to the data flow. If the secondary egress switch port routing address is to be used, then a secondary egress flow identity is assigned to the data flow.

The primary egress flow identity is associated with one of the flow resources of the egress switch port corresponding to the primary egress switch port routing address. The secondary egress flow identity is associated with one of the flow resources of the secondary egress switch port corresponding to the secondary egress switch port routing address. The same group identity may be assigned to all data flows belonging to said protected domain and using the same primary egress port.

The apparatus according to the invention relates to a switching fabric including at least one primary egress switch port and at least one secondary egress switch port. A routing table is arranged to indicate which group identity an ingress flow identity of a data flow is associated with. A selection table is arranged to indicate if a primary egress switch port routing address or a secondary egress switch port routing is to be used for said data flow. The selection table may be arranged to indicate if a primary egress flow identity or a secondary egress flow identity is to be assigned to said data flow.

A protected domain includes a working entity and a protection entity. The working entity includes at least one flow resource of at least one primary egress switch of a switching fabric. The protection entity includes at least one flow resource of at least one secondary egress switch port of said switching fabric. The switching fabric further includes a routing table arranged to indicate which group identity an ingress flow identity of a data flow is associated with, and a selection table arranged to indicate if a primary egress switch port routing address or a secondary egress switch port routing address is to be used for said data flow.

The selection table may be arranged to indicate if a primary egress flow or a secondary egress flow identity is to be assigned to said data flow. The primary egress flow identity is associated with one of the flow resources of the primary egress switch port corresponding to the primary egress switch port routing address, and the secondary egress flow identity may be associated with one of the flow resources of the secondary egress switch port corresponding to the secondary egress switch port routing address. The same group identity may be assigned to all data flows belonging to said protected domain and using the same primary egress switch port.

The invention claimed is:

1. Method for protection switching in a switching fabric including at least one primary egress switch port and at least one secondary egress switch port comprising:
    checking a group identity an ingress flow identity (IFI) of a data flow is associated with,
    checking if a primary egress switch port routing address or a secondary egress switch port routing address is to be used for said group identity,
    switching the data flow to the egress switch port corresponding to the egress switch port routing address that is to be used, characterized by:
    if the primary egress switch port routing address is to be used, then assigning a primary egress flow identity to the data flow,
    if the secondary egress switch port routing address is to be used, then assigning a second egress flow identity to the data flow.

2. Method for protection switching in a protected domain including a working entity and protection entity, said working entity including at least one flow resource of at least one primary egress switch of a switching fabric, said protection entity including at least one flow resource of at least one secondary egress switch port of said switching fabric said, method comprising:
    checking a group identity an ingress flow identity of a data flow is associated with,
    checking if a primary egress switch port routing address or a secondary egress switch port routing address is to be used for said group identity,
    switching the data flow to the egress switch port to the egress switch port routing address (ERA, ERA') that is to be used, characterized by:
    if the primary egress switch port routing address is to be used, then assigning a primary egress flow identity (EFI) to the data flow,
    if the secondary egress switch port corresponding routing address is to be used, then assigning a secondary egress flow identity to the data flow,
    associating the primary egress flow identity with one of the flow resources of the egress switch port corresponding to the primary egress switch port routing address,
    associating the secondary egress flow identity with one of the flow resources of the secondary egress switch port corresponding to the secondary egress switch port routing address.

3. Method for protection switching according to claim 2, characterized by the following step:
    assigning the same group identity to all data flows belonging to said protected domain and using the same primary egress port.

4. A switching fabric including at least one primary egress switch port and at least one secondary egress switch port comprising:
    a routing table arranged to indicate which group identity an ingress flow identity of a data flow is associated with, and
    a selection table arranged to indicate if a primary egress switch port routing address or a secondary egress switch port routing address is to be used for said data flow, characterized in that:
    the selection table further is arranged to indicate if a primary egress flow identity or a secondary egress flow identity is to be assigned to said flow,
    the primary egress flow identity is associated with one of the flow resources of the primary egress switch port corresponding to the primary switch port routing address,
    the secondary egress flow identity is associated with one of the flow resources of the secondary egress switch port corresponding to the secondary egress switch port routing address.

5. Switching fabric according to claim 4, wherein:
    the selection table further is arranged to indicate if a primary egress flow identity or a secondary egress flow identity is to be assigned to said flow data.

6. A protected domain comprising:
    a switching fabric including at least one flow resource of at least one primary egress switch of the switching fabric;
    a protection entity including at least one flow resource of at least one secondary egress switch port of the switching fabric,
    wherein the switching fabric includes:
    a routing table arranged to indicate which group identity an ingress flow identity of a data flow is associated with, and
    a selection table arranged to indicate if a primary egress switch port routing address or a secondary egress switch port routing address is to be used for said data flow, characterized in that:
    the selection table further is arranged to indicate if a primary egress flow identity or a secondary egress flow identity is to be assigned to said flow data flow,
    the primary egress flow identity is associated with one of the flow resources of the primary egress switch port corresponding to the primary switch port routing address,
    the secondary egress flow identity is associated with one of the flow resources of the secondary egress switch port corresponding to the secondary egress switch port routing address.

7. Protected domain according to claim 6, characterized in that the same group identity is assigned to all data flows belonging to said protected domain and using the same primary egress switch port.

* * * * *

UNITED STATES PATENT AND TRADEMARK OFFICE
CERTIFICATE OF CORRECTION

| | | |
|---|---|---|
| PATENT NO. | : 7,215,664 B2 | Page 1 of 1 |
| APPLICATION NO. | : 10/279027 | |
| DATED | : May 8, 2007 | |
| INVENTOR(S) | : Lindstrom | |

It is certified that error appears in the above-identified patent and that said Letters Patent is hereby corrected as shown below:

In Column 4, Line 39, delete "touting" and insert -- routing --, therefor.

In Column 8, Line 22, in Claim 4, after "said" insert -- data --.

Signed and Sealed this

Eighth Day of April, 2008

JON W. DUDAS
*Director of the United States Patent and Trademark Office*